J. Robingson,

Chain Pump,

Nº 16,024.

Patented Nov. 4, 1856.

UNITED STATES PATENT OFFICE.

JOHN ROBINGSON, OF NEW BRIGHTON, PENNSYLVANIA.

CHAIN PUMP.

Specification of Letters Patent No. 16,024, dated November 4, 1856.

*To all whom it may concern:*

Be it known that I, JOHN ROBINGSON, of New Brighton, in the county of Beaver and State of Pennsylvania, have invented a certain new and useful Improvement in Chain and Bucket Pumps; and I do hereby declare that the following is a full, clear, and exact description of the same, reference being had to the annexed drawings, making a part of this specification, in which—

Figure 1:
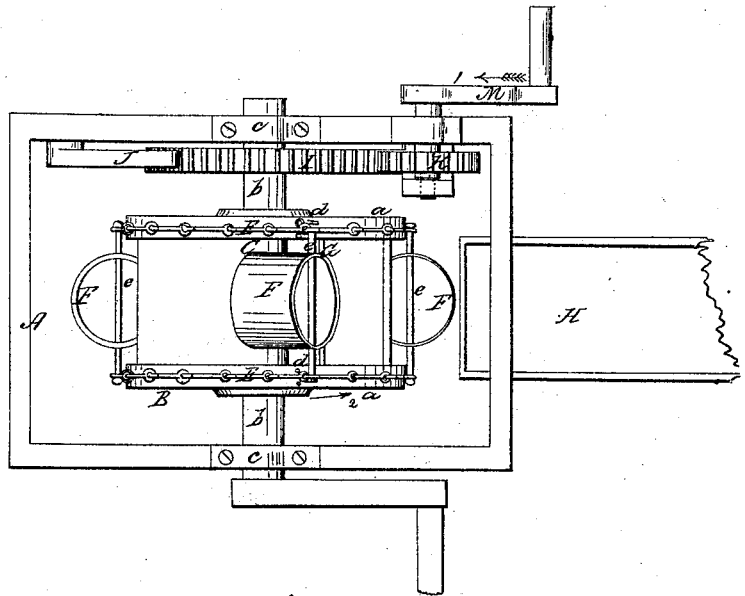
Figure 2:
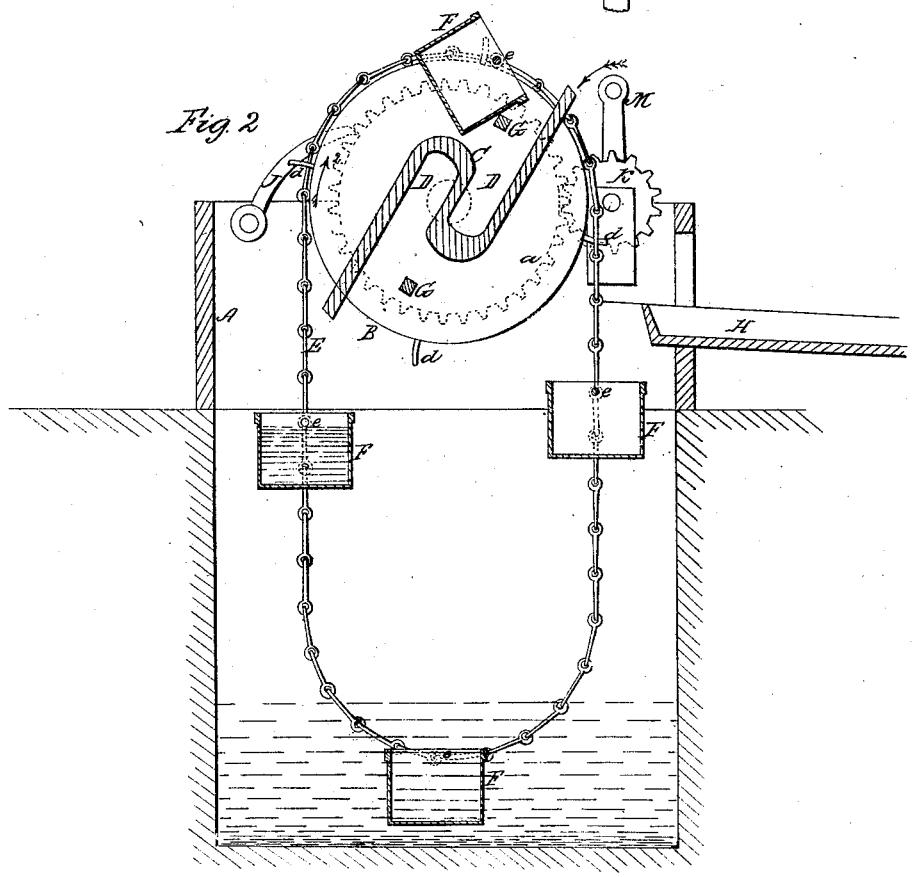

Figure 1, is a plan or top view of my improvement. Fig. 2, is a vertical section of ditto, the plane of section being through the center.

Similar letters of reference indicate corresponding parts in the two figures.

To enable those skilled in the art to fully understand and construct my invention, I will proceed to describe it.

A, is a rectangular box, which may serve as a well curb, and B, is a wheel formed of two disks $(a)$, $(a)$, which are connected by a curved partition C, as shown in Fig. 2. The disks $(a)$, $(a)$, have journals $(b)$, attached to the centers of their outer sides, said journals working in bearings, $(c)$, on the curb or box A. The partition C, is so formed or curved, as to form two chambers D, D, and the ends of the partition project a little farther outward than the peripheries of the disks, $(a)$, $(a)$.

E, E, represent two chains which pass around the disks $(a)$, $(a)$, a chain on each disk. These chains work in forked guides, $(d)$, on the disks. The two chains have transverse rods, $(e)$, attached to them, at proper and equal distances apart, and to these rods, buckets F, are secured, the buckets being between the two chains, as shown clearly in Fig. 1. The rods $(e)$, are allowed to turn in the chains E, E, and the chains of course are made sufficiently long to pass below the surface of the water in the well, as shown in Fig. 2.

Between the disks, $(a)$, $(a)$, two bars G, G, are placed, a bar being over each chamber or trough D.

H, represents a box or spout, which is attached to one side of the well curb or box A. On one of the journals $(b)$, a toothed wheel I, is placed, into which a pawl J, catches. Into the wheel I, a pinion K, gears, said pinion being upon a shaft L, to which a crank M, is attached.

When the crank M, is turned in the direction indicated by the arrow 1, the disks, $(a)$, $(a)$, will rotate in the direction indicated by arrow 2, and the buckets F, will pass around the disks or wheel B, and will become filled in passing through the water, the buckets as they arrive at the top of the wheel are tilted, in consequence of striking against the bars G, and the contents of the buckets are discharged into the chambers or troughs D, and when the chambers or troughs descend a little, so as to approach a point nearly in line with the box or spout H, the water passes from the chambers or troughs into the box or spout H.

The wheel B is retained in proper position, or prevented from turning backward when stopped, by a pawl J.

As the buckets F and stops G which cause the buckets to tilt rotate together in a like direction, there is no objectionable jar, noise, or destructive percussion, while the serpentine or zig-zig partition C (likewise rotating in common with the rest) is such and the stops or bars G so arranged in relation thereto, that the buckets in emptying themselves into the revolving troughs D, formed by said partition C, cause the water to impinge at a leverage on the drum or wheel to aid it in lifting the next filled and ascending bucket and, in running down the one inclined side or leg of the partition C, to produce a further similar advantageous effect in addition to the mere weight of the water so acting down to the last drop of its delivery from the wheel, which delivery by the projecting character of the partition, centrifugal effect of the same and the inclining downward position of its side making the delivery as said side approaches the spout, is not a mere passing off of the water from the drum or wheel but is a forcible projection of it into the spout far beyond the well curb so that no raised water is lost by running back into the well, whatever the speed the pump be run at, and the entire delivery each discharge is in a steady and even stream without heavy jar and economizing the driving power as before stated.

I do not claim the drum or wheel B with the buckets hung as described in it and tilted by striking a stop, the bucket chains passing around the sides of the drum, as such and many other parts or details are common to chain bucket pumps. But What I do claim as new and useful herein, and desire to secure by Letters Patent, is—

Providing the wheel B, having its buckets and chains arranged as described, with a partition C forming troughs D D, and tilting stops or bars G, arranged relatively to each other and rotating together with the wheel and its buckets for operation together as specified.

JNO. ROBINGSON.

Witnesses:
C. R. TUTTLE,
JOHN M. TUTTLE.